US006310984B2

United States Patent
Sansom-Wai et al.

(10) Patent No.: US 6,310,984 B2
(45) Date of Patent: *Oct. 30, 2001

(54) IMAGE PROCESSING SYSTEM WITH IMAGE CROPPING AND SKEW CORRECTION

(75) Inventors: Cindy Y. Sansom-Wai, San Diego; Irene H. Williams, Escondido; Daniel R. Tretter, Mountain View, all of CA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/057,847

(22) Filed: Apr. 9, 1998

(51) Int. Cl.⁷ ..................................... G06K 9/36
(52) U.S. Cl. ............................ 382/289; 382/173
(58) Field of Search ..................... 382/289, 290, 382/291, 292, 293, 294, 295, 296, 297, 176, 173, 175, 174, 177, 178, 179, 180, 190, 224, 225; 340/724, 725, 726, 727, 710, 750, 706, 735

(56) References Cited

U.S. PATENT DOCUMENTS

| | | |
|---|---|---|
| 4,533,959 | 8/1985 | Sakurai . |
| 4,723,297 | 2/1988 | Postl . |
| 4,802,229 | 1/1989 | Yamada . |
| 4,823,395 | 4/1989 | Chikanchi . |
| 4,876,730 | 10/1989 | Britt . |
| 4,941,189 | 7/1990 | Britt . |
| 4,953,230 | 8/1990 | Kurose . |
| 5,001,766 * | 3/1991 | Baird ........................ 382/46 |
| 5,093,653 * | 3/1992 | Ikehira ...................... 340/727 |
| 5,181,260 * | 1/1993 | Kurosu et al. ............. 382/46 |
| 5,355,420 | 10/1994 | Bloomberg et al. . |
| 5,452,374 * | 9/1995 | Cullen et al. ............. 382/293 |
| 5,506,918 * | 4/1996 | Ishitani ..................... 382/289 |
| 5,517,587 | 5/1996 | Baker et al. . |
| 5,818,976 * | 10/1998 | Pasco et al. .............. 382/289 |
| 5,854,854 * | 12/1998 | Cullen et al. ............. 382/176 |
| 5,901,253 * | 5/1999 | Tretter ...................... 382/289 |
| 5,940,544 * | 8/1999 | Nako ........................ 382/293 |

FOREIGN PATENT DOCUMENTS

WO 95/12271  5/1995  (WO) .................. H04N/1/047

OTHER PUBLICATIONS

Jiang Liu, et al., "An Efficient Method For The Skew Normalization Of A Document", IEEE, Jul. 1992, pp. 122–125.

Yasuaki Nakano, et al., "An Algorithm For The Skew Normalization Of Document Image", IEEE, May 1990, pp. 8–13.

Stuart C. Hinds, et al., "A Document Skew Detection Method Using Run–Length Encoding And The Hough Transform", IEEE, May 1990, pp. 464–468.

* cited by examiner

Primary Examiner—Phuoc Tran
Assistant Examiner—Amir Alavi

(57) ABSTRACT

A system and method is described for automatically determining in a scanned document image the presence of unwanted extraneous information caused by an extraneous device and scanner background information. Once the presence of this information is determined, the system and method of the present invention can compute, for instance, skew and crop statistics. From this, the image can be automatically deskewed and cropped appropriately without the background and extraneous information. The system and method accomplishes this by first determining the presence of unwanted extraneous and background information and then appropriately processing the document image. The extraneous information is ignored during deskew and crop computations. Also, the scanner background and the extraneous information are prevented from being included in the final digital representation of the image.

20 Claims, 12 Drawing Sheets

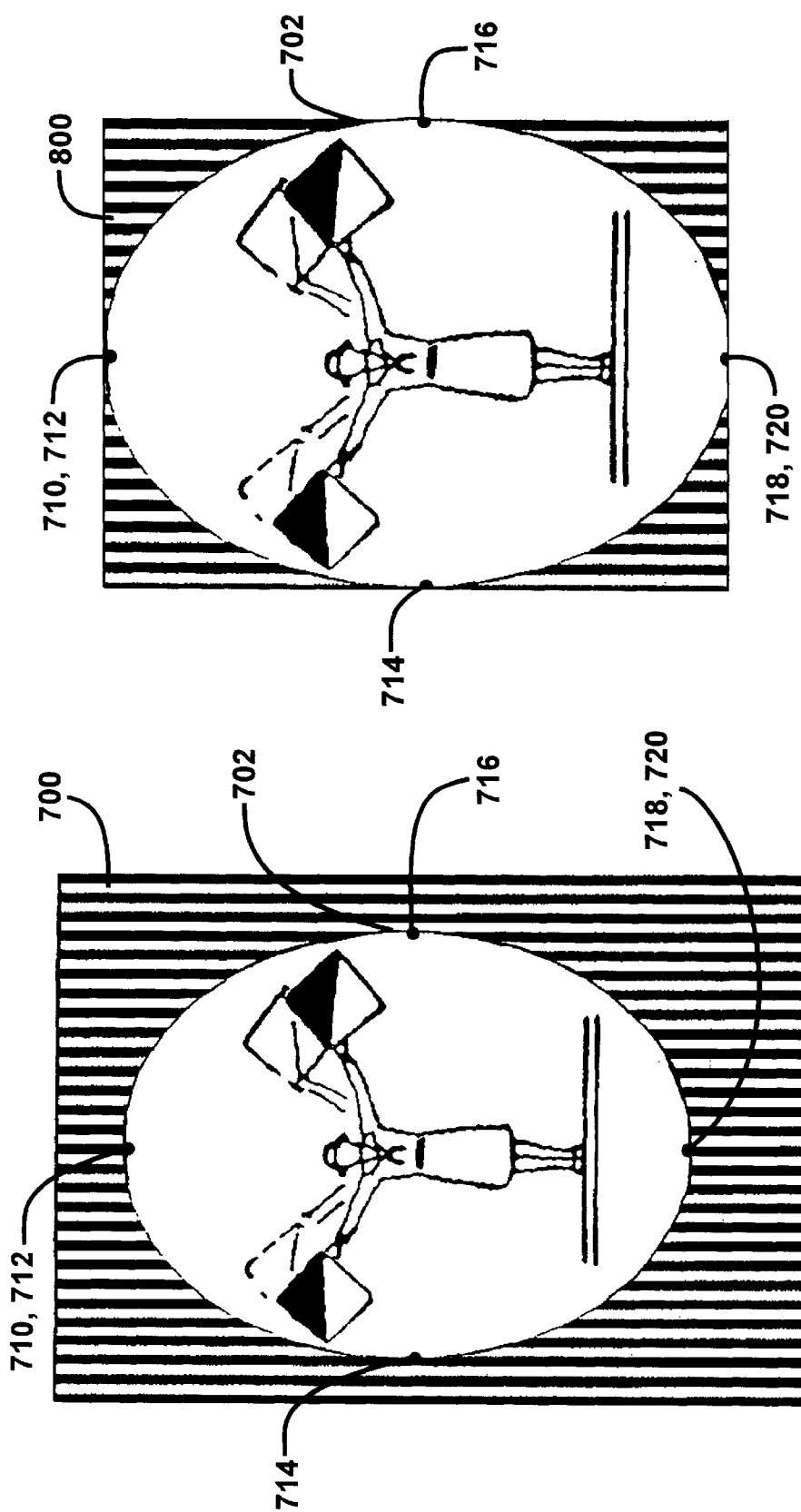

IMAGE PROCESSING SYSTEM WITH IMAGE CROPPING AND SKEW CORRECTION

BACKGROUND OF THE INVENTION

1. Field of the Invention

The present invention pertains to image processing systems. More particularly, this invention relates to an image processing system with (1) skew correction that does not require human intervention or the presence of text or skew detection information on the original document, and (2) image cropping that is done regardless of the shape of the image.

2. Description of the Related Art

It has been known that when a document (i.e., the original physical object, such as photo or text document) is scanned by a scanner, a digital image of the original document is typically generated. The digital image of the original document is, however, often found to be skewed (rotated) inside the entire scan image (i.e., inside the entire digital image obtained from the scanner). As is known, the scan image typically includes the image of the document as well as background information. A skew or inclination of the document image within the scan image is particularly likely to occur when the scanner uses an automatic document feed mechanism to feed the original document for scanning. In addition, when the size of the original document is relatively small in comparison to the scan region of the scanner, the scan image may contain considerable amount of background information.

For instance, some scanning devices are automatic sheet fed scanners with stationery charge coupled devices (CCD's). These scanning devices feed the document past the CCD for scanning. The document must be grabbed by a set of rollers for scanning. This mechanism can sometimes scratch the document. Also, small documents may not be securely grabbed or reliably sensed by the mechanism. In addition, only a single document at a time can be fed in the scanner. As a result, document carriers are used to overcome these problems. A document carrier is usually a transparent envelope having a white backdrop. The document or documents of interest are inserted within the envelope for scanning. The document carrier protects the scanned document from scratches and also provides the rollers with a larger width original to grab, thereby accomplishing successful feeding of the document through the scanner.

However, one disadvantage of using a document carrier is that the document carrier also becomes part of the scanned data. For example, if the carrier color does not exactly match the color of the scanner background, edges of the document carrier will be contained in the scanned data. This spurious data will cause the digital image to contain unwanted extraneous information. FIG. 1 illustrates a scan image 100 that exhibits these problems.

As can be seen from FIG. 1, the scan image 100 contains a document image 110 of an original document. The remaining area of the scan image 100 is background 120, which typically has a predetermined pixel pattern, and extraneous information 140, which typically has known characteristics. The background 120 can be caused by the scanner background while the extraneous information 140 can be caused by a document carrier. The document image 110 is skewed inside the scan image 100 and the background 120 is a considerable fraction of the scan image 100. When the scan image 100 is displayed on a display or printed by a printer, the document image 110 typically has a relatively unpleasant and poor visual quality. In addition, the skewed image may also cause errors when the image data is further processed by other software programs, such as optical character recognition programs.

Techniques have been developed to try to detect and correct the skew problem. For example, U.S. Pat. No. 4,941,189, entitled OPTICAL CHARACTER READER WITH SKEW RECOGNITION and issued on Jul. 10, 1990, describes a skew correction technique that searches for text characters along a scan line. As another example, U.S. Pat. No. 5,452,374, entitled SKEW DETECTION AND CORRECTION OF A DOCUMENT IMAGE REPRESENTATION and issued on Sep. 19, 1995, describes another technique that segments the scan image into text and non-text regions and then determines the skew information based on the resulting segmentation.

These techniques, however, require the original document to contain at least some text. The techniques then rely on the detection of one or more lines of the text in the document. With the advent of inexpensive photo scanners and multimedia personal computers, scanners are nowadays used to scan not only text documents, but photographs and other image documents as well. The photographs, however, typically do not contain any text data. This thus causes the skew detection and correction techniques to be inapplicable to the scanned photo images. In addition, because photographs can have a variety of sizes and shapes, it is typically difficult to trim the background information from the scanned image of a photograph.

Another technique has been proposed that detects the skew information of a scanned image without requiring the presence of text in the scanned document. One such technique is described in U.S. Pat. No. 5,093,653, entitled IMAGE PROCESSING SYSTEM HAVING SKEW CORRECTION MEANS, and issued on Mar. 3, 1992. However, this technique requires human intervention.

SUMMARY OF THE INVENTION

Described below is a system and method for automatically determining in a scanned document image the presence of unwanted extraneous information caused by an extraneous device, for example, a document carrier and scanner background information. Once the presence of this information is determined, the system and method of the present invention can compute, for instance, skew and crop statistics. From this, the image can be automatically deskewed and cropped appropriately without the background and extraneous information (such as marks from the document carrier). The system and method accomplishes this by first determining the presence of unwanted extraneous and background information and then appropriately processing the document image. The extraneous information is ignored during deskew and crop computations. Also, the scanner background and the extraneous information are prevented from being included with the final digital representation of the image.

Specifically, scanner background information and any extraneous information, such as edges created by the document carrier, are ignored when processing information is computed, such as skew and crop statistics, while image edges are retained, such as document edges of an image or text pages. Thus, the system and method of the present invention optimizes automatic cropping and deskewing results of document images scanned by general purpose scanning devices that are used with or without document carriers.

Also, the system and method described below determines a skew angle of the document image without requiring text in the document or human intervention. This feature is accomplished by determining an edge of the document image within a scan image and using that edge to determine the skew angle of the document image. The edge can be determined by locating the first or last document image pixel of each scan line of pixels in the scan image that belongs to the document image (i.e., the edge pixel of the document image along that scan line). This is accomplished by comparing a scan line of pixels with a predetermined scan line of background pixels or alternatively by comparing a neighborhood around a scan line with predetermined background pixels. The skew angle of the document image is then determined by computing the slope of the detected edge in the scan image.

In addition, the system and method described below can determine the boundary of the document image. This feature is accomplished by locating (1) a first document image pixel and a last document image pixel for a first scan line of the document image in the scan image, (2) a first document image pixel and a last document image pixel of a last scan line of the document image in the scan image, (3) a leftmost document image pixel of the document image in the scan image, and (4) a rightmost document image pixel of the document image in the scan image.

BRIEF DESCRIPTION OF THE DRAWINGS

The present invention is illustrated by way of example and not by way of limitation in the Figures of the accompanying drawings, in which like references indicate similar elements, and in which:

FIG. 7 shows another document image generated by the image processing system of FIGS. 3 or 4 before being processed by the automatic deskew and image cropping system of FIGS. 3 and 4;

FIG. 8 shows the document image of FIG. 7 after being processed by the automatic deskew and image cropping system of FIGS. 3 and 4;

DETAILED DESCRIPTION OF THE INVENTION

The present invention is a system and method for automatically determining scanner background information and extraneous information within a digital representation of a scanned document image. The scanner background information is caused by the scanner's background and the extraneous information is caused by an extraneous device, such as a document carrier. For instance, due to the physical appearance of the document carrier, it can leave marks within the digital representation of the scanned document image. Once the presence of this information is determined, the system and method of the present invention can compute, for instance, skew and crop statistics. From this, the image can be automatically deskewed and cropped appropriately without the background and extraneous information.

The present invention can be used with general purpose scanning devices for scanning an image as scanned data input. The image can be a photograph, multiple photographs in one scan, text only or mixed documents containing photographs, text, graphics, etc. The present invention parses the scanned data input for determining the presence of scanner background information and extraneous information, which, for example, can be caused by a document carrier. Also, the scanned data input is parsed for determining edges and a skew angle of the image. The parsed data is used to compute skew and crop statistics of the scanned data for cropping and deskewing the image. This ultimately provides an aligned digital representation of the scanned image without unwanted scanner background information and extraneous information. Specifically, the scanner background and any indicia of an extraneous device, such as a document carrier, are ignored when the skew and crop statistics are computed, while image edges are retained, such as document edges of text pages. Thus, the present invention properly crops and deskews images scanned by general purpose scanning devices that are used with or without document carriers.

One of the features of the present invention is to provide skew correction for a scanned image without requiring the presence of text. Another feature of the present invention is to provide skew correction for a scanned image without requiring human intervention. A further feature of the present invention is to provide image cropping for a scanned image regardless of the size and/or shape of the original. A still further feature of the present invention is to provide skew correction and image cropping for a scanned image in a cost effective manner.

Figure 1:
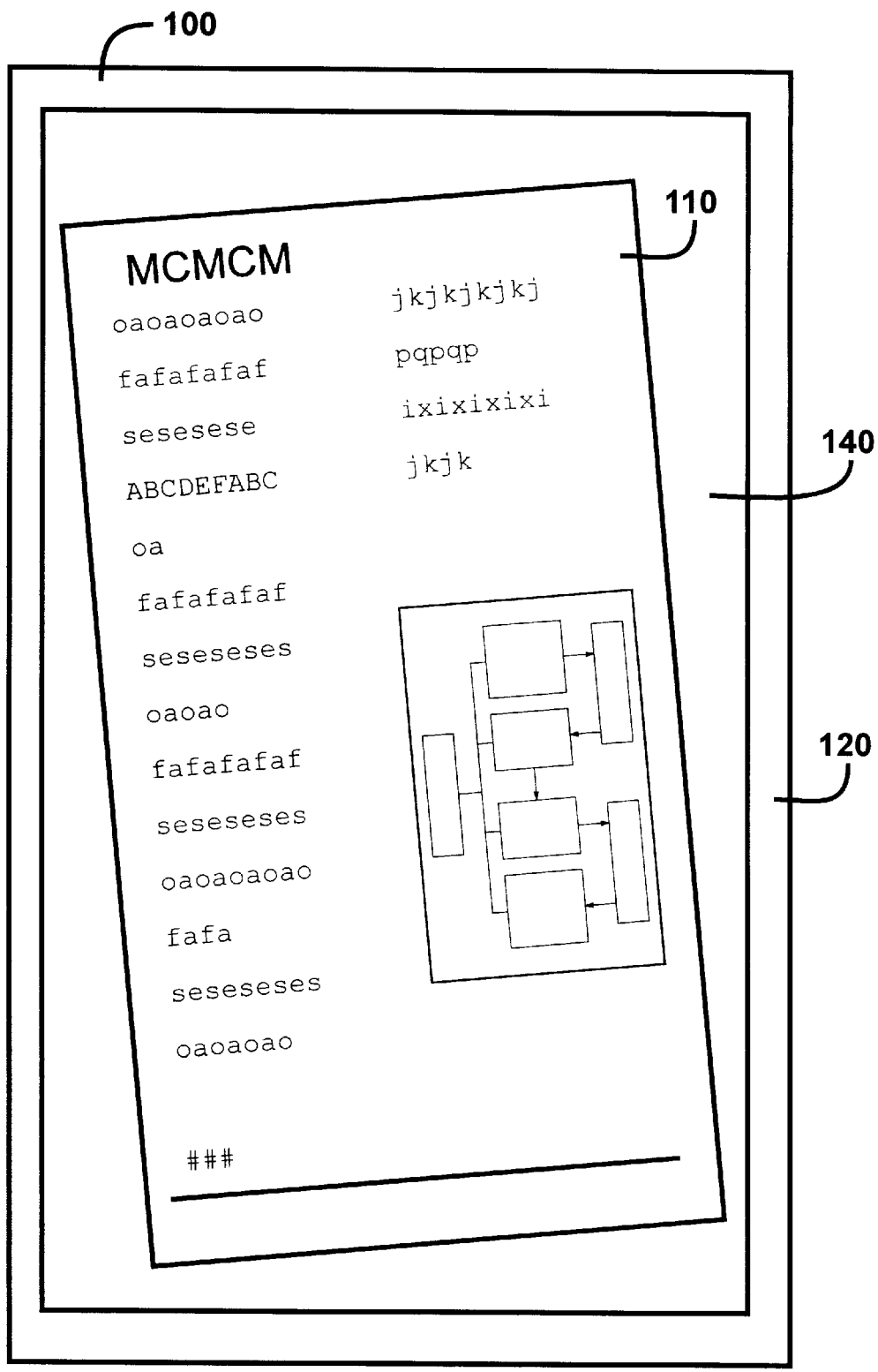
FIG. 1 shows a skewed image of a document in a scan.
Figure 2:
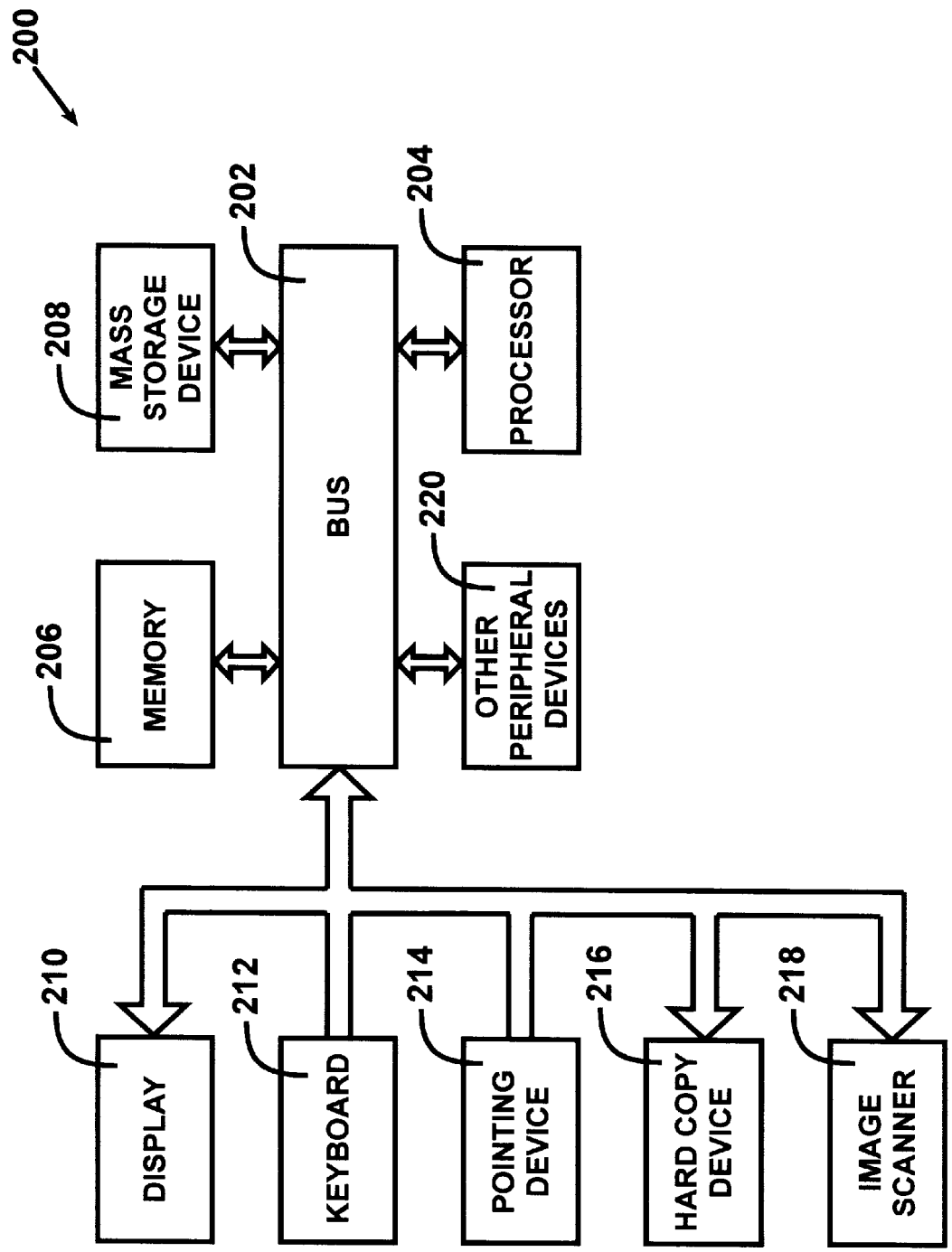
FIG. 2 shows a computer system that implements an image processing system.

FIG. 2 illustrates a computer system 200 that implements an image processing system 320 (shown in FIGS. 3 and 4) within which an automatic deskew and image cropping system 322 (shown in FIGS. 3 and 4) in accordance with one embodiment of the present invention may be implemented. Although FIG. 2 shows some of the basic components of the computer system 200, it is neither meant to be limiting nor to exclude other components or combinations of components in the system. The image processing system 320 and t he automatic deskew and image cropping system 322 in accordance with the present invention will be described in more detail below, also in conjunction with FIGS. 3 through 12.

In one embodiment, the computer system 200 can be a personal computer having a scanner, a notebook computer having a scanner, a palmtop computer having a scanner, a workstation having a scanner, or a mainframe computer having a scanner. In another embodiment, the computer system 100 c an be a scan system that also has some or all of the components of a computer system.

As can be seen from FIG. 2, the computer system 200 includes a bus 202 for transferring data and other information. The computer system 200 also includes a processor 204 coupled to the bus 202 for processing data and instructions. The processor 204 can be any known and commercially available processor or microprocessor. A memory 206 is also provided in the computer system 200. The memory 206 is connected to the bus 202 and typically stores information and instructions to be executed by the processor 204. The memory 206 may also include a frame buffer (not shown in FIG. 2) that stores a frame of bitmap image to be displayed on a display 210 of the computer system 200.

The memory 206 can be implemented by various types of memories. For example, the memory 206 can be implemented by a RAM (Random Access Memory) and/or a nonvolatile memory. In addition, the memory 206 can be implemented by a combination of a RAM, a ROM (Read Only Memory), and/or an electrically erasable and programmable nonvolatile memory.

The computer system 200 also includes a mass storage device 208 connected to the bus 202. The mass storage device 208 stores data and other information. In addition, the mass storage device 208 stores system and application programs. The programs are executed by the processor 204 and need to be downloaded to the memory 206 before being executed by the processor 204.

The display 210 is coupled to the bus 202 for displaying information to a user of the computer system 200. A keyboard or keypad input device 212 is also provided that is connected to the bus 202. An additional input device of the computer system 200 is a cursor control device 214, such as a mouse, a trackball, a trackpad, or a cursor direction key. The cursor control device 214 is also connected to the bus 202 for communicating direction information and command selections to the processor 326, and for controlling cursor movement on the display 210. Another device which may also be included in the computer system 200 is a hard copy device 216. The hard copy device 216 is used in the computer system 200 to print text and/or image information on a medium such as paper, film, or similar types of media.

In addition, the computer system 200 includes an image scanner 218. The image scanner 218 is used to convert an original document (i.e., the original physical document, such as photo or text document) into a digitized image which can be further processed by the computer system 200. In one embodiment, the image scanner 218 is a fax machine-type image scanner that has a scan region of one scan line wide. The length of the scan region is the width of the scan line. In this case, the scan head of the image scanner 218 simultaneously images the entire scan line. A document feed mechanism is provided to advance the original document after each scan. In another embodiment, the image scanner 218 is a copier-type image scanner that has a relatively large scan region. For this type of scanner, the original document is placed against the scan window of the scanner and the scan head of the scanner moves in one direction after each scan.

The computer system 200 also includes other peripheral devices 220. These other devices 220 may include a digital signal processor, a MODEM (modulation/demodulation), and/or a CD-ROM drive. In addition, the computer system 200 may function without some of the above described components. For example, the computer system 200 may function without the hard copy device 216.

Figure 3:
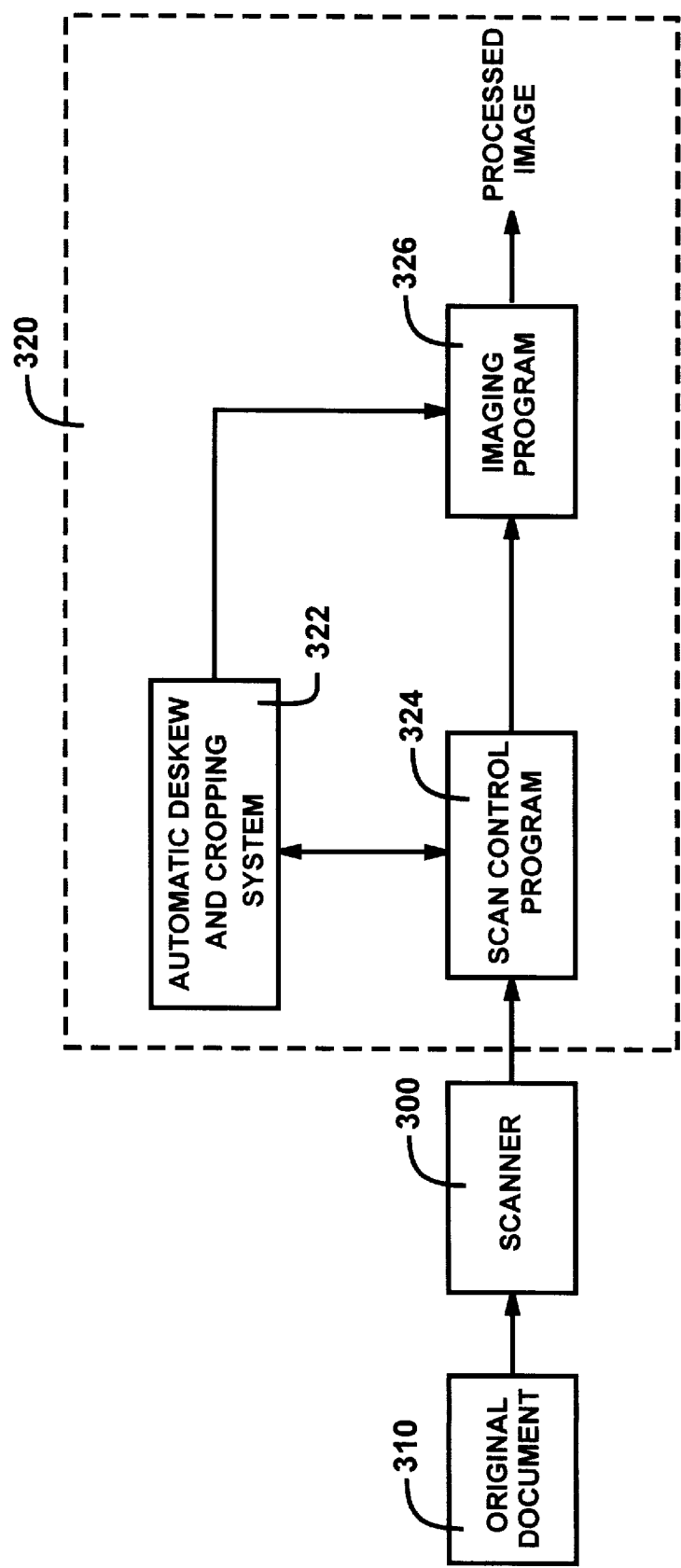
FIG. 3 shows the image processing system implemented by the computer system of FIG. 2, wherein the image processing system includes an automatic deskew and image cropping system in accordance with one embodiment of the present invention.
Figure 4:
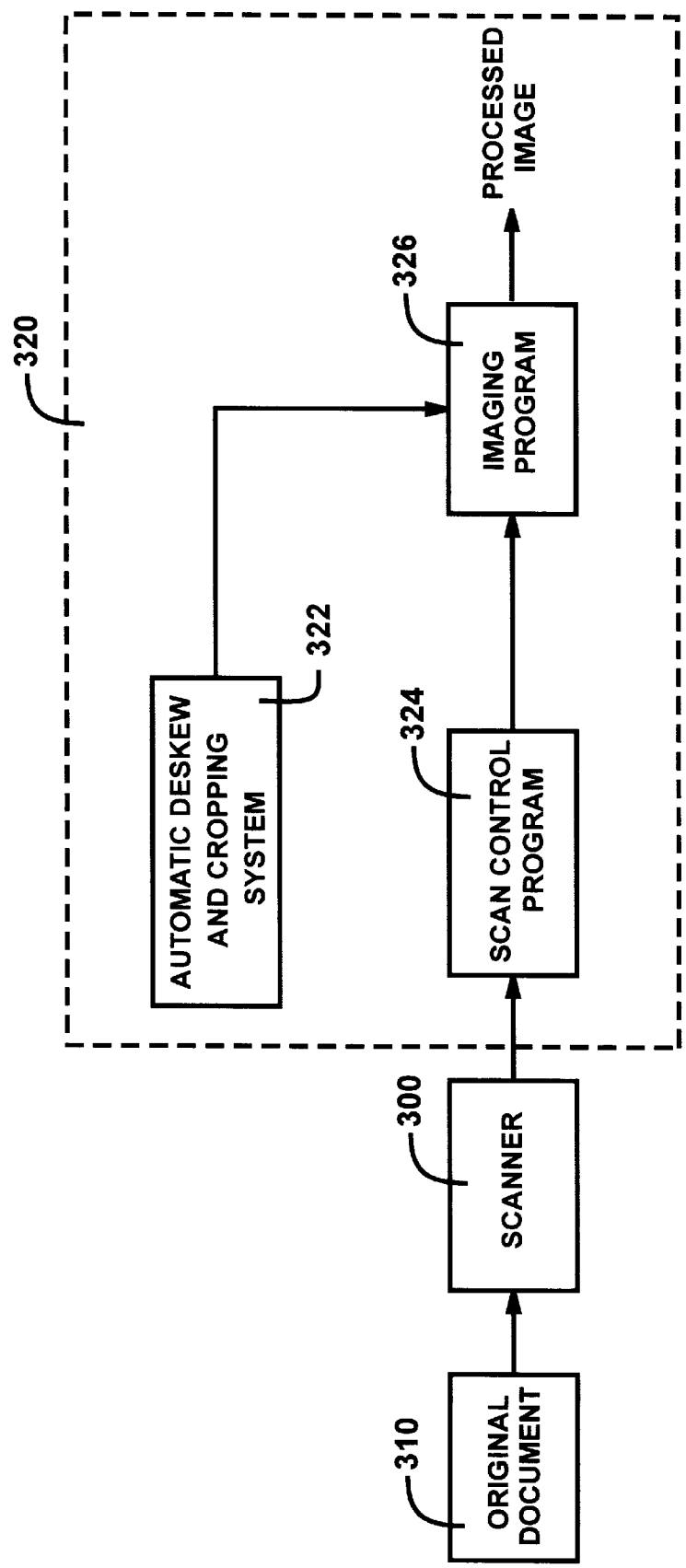
FIG. 4 illustrates a different configuration of the automatic deskew and image cropping system in the image processing system of FIG. 3.

As described above, the computer system 200 includes the image processing system 320 (shown in FIGS. 3 and 4) which includes the automatic deskew and image cropping system 322 of the present invention (also shown in FIGS. 3 and 4). In one embodiment, the image processing system 320 is implemented as a series of software programs that are run by the processor 326, which interacts with scan data received from the scanner 218. It will, however, be appreciated that the image processing system 320 can also be implemented in discrete hardware or firmware.

Similarly, the automatic deskew and image cropping system 322 alone can be implemented either as a software program run by the processor 326 or in the form of discrete hardware or firmware within the image processing system 320. The image processing system 320, as well as the automatic deskew and image cropping system 322, will be described in more detail below, in the form of software programs.

As can be seen from FIG. 3, the image processing system 320 includes a scan control program 324 and an imaging program 326, in addition to the automatic deskew and image cropping system 322. All of the programs 322 through 326 are typically stored in the mass storage device 208 of the computer system 200 (FIG. 2). These programs are loaded into the memory 206 from the mass storage device 208 before they are executed by the processor 204.

The scan control program 324 interfaces with the scanner 218 and the imaging program 326. The function of scan control program 324 is to control the scanning operation of the scanner 218 and to receive the scan image of an original document 310 from the scanner 218. As is known, the scan image of a document typically includes the digital image of the document (i.e., the document image) and some background image and extraneous information if an extraneous device, such as a document carrier, is used to aid in scanning the document. The scan control program 324 can be, for example, a scanner driver program for the scanner 218. Alternatively, the scan control program 324 can be any known scanner program for interfacing the scanner 218 with a user.

Figure 5:
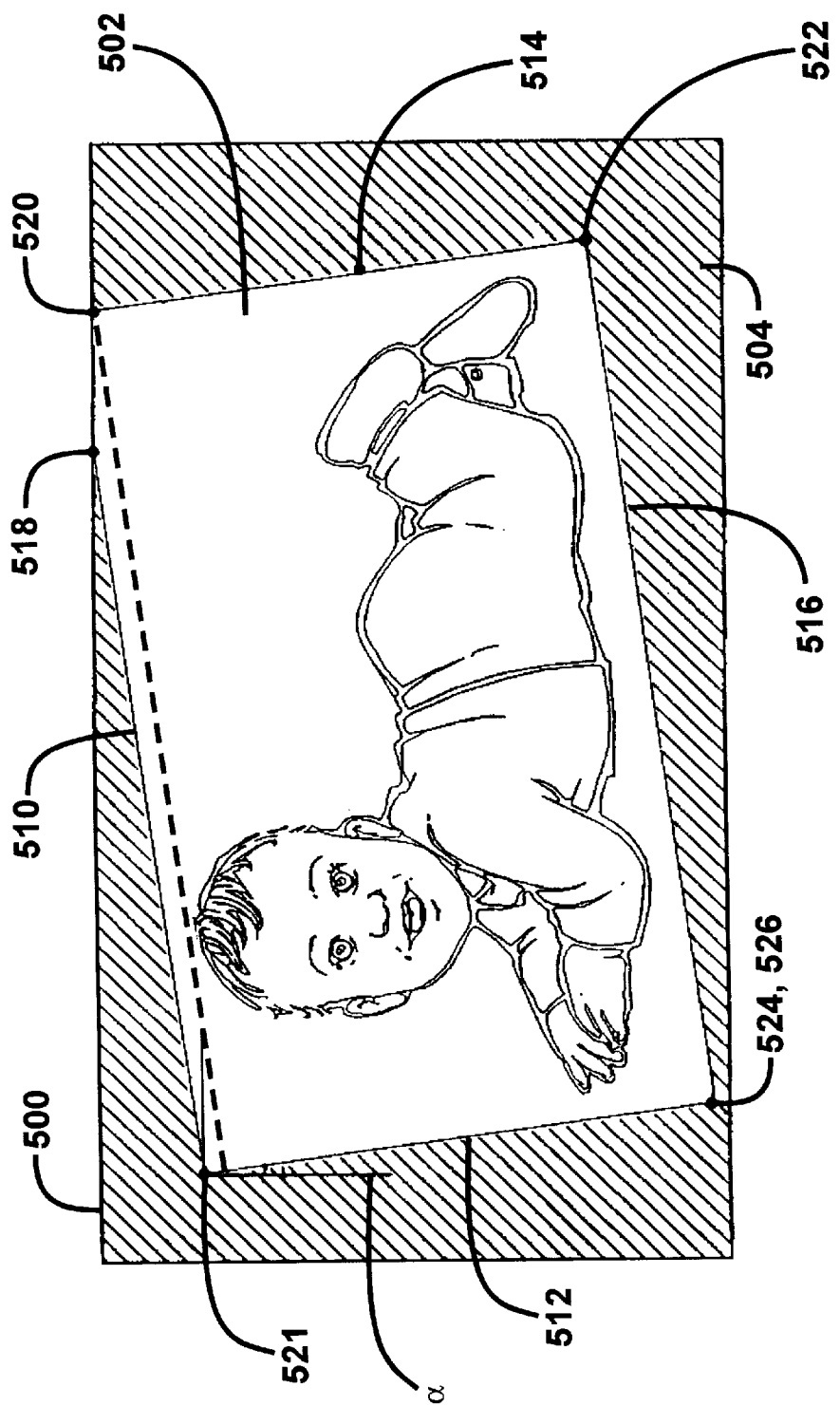
FIG. 5 shows a document image generated by the image processing system of FIGS. 3 or 4 before being processed by the automatic deskew and image cropping system of FIGS. 3 and 4.

As described above, the scan control program 324 controls the scanner 218 to scan the document 310. The original document 310 can be of different shapes and sizes. For example, the document 310 can be of a rectangular shape, a polygon shape, or a circular or oval shape. FIG. 5 shows one example of a scan image 500 of the document 310 obtained by the scan control program 324. As can be seen from FIG. 5, the document image 502 of document 310 is skewed inside the scan image 500 and has a skew angle α. As can be seen from the scan image 500, the scanned document 310 has a rectangular shape. FIG. 7 shows another scan image 700 of the document 310 obtained by the scan control program 324 when the document 310 has an oval shape. Both FIGS. 5 and 7 show considerable background within scan images 500 and 700, respectively.

As shown in FIG. 3, the imaging program 326 is used in the image processing system 320 to process the scan image (e.g., the scan image 500 or 700 of FIG. 5 or 7, respectively) of the original document 310 received from the scan control program 324. The imaging program 326 typically processes the scan image of the original document 310 so that the scan image can be displayed on the display 210 or printed by the hard copy device 216. The processing functions of the imaging program 326 typically include resampling and interpolation of the scan image. The imaging program 326 typically includes a device-specific image driver program. For example, the imaging program 326 can include a known display driver program or a known printer driver program. The imaging program 326 can be any image processing application.

As can be seen from FIG. 3, the automatic deskew and image cropping system 322 of the image processing system 320 interfaces with the scan control program 324 and the imaging program 326. The automatic deskew and image cropping system 322 receives digital data representing the scan image of the document 310 from the scan control program 324 and automatically determines the presence of scanner background information and extraneous information caused by an extraneous device, such as a document carrier. For instance, due to the physical appearance of the document carrier, it can leave marks within the digital data representing the scanned document image 310. The automatic deskew and image cropping system 322 ignores the scanner background information and extraneous information and detects the skew angle and boundary of the document image of the document 310 within the scan image. This provides correction of the skew of the document image (i.e., deskewed) so that much or all of the scanner background information and the extraneous information of the image can be eliminated.

In the case where a document carrier is used, the document carrier can cause unwanted extraneous information because it becomes part of the scanned data. For example, if the carrier color does not exactly match the color of the scanner background, edges of the document carrier will be contained in the scanned data. The present invention detects and deliberately ignores this spurious data and it is deemed as invalid image data. As a result, the document carrier information does not influence the results of other functions and operations of the automatic deskew and image cropping system 322, such as the automatic crop and deskew functions (discussed below in detail).

Many different document carrier sizes exist, and the present invention is not limited to any particular size. For illustrative purposes only, two such sizes of document carriers are a full page carrier, which can be approximately 8.5"×11" (usually for text or mixed documents), and a half page carrier, which can be approximately 8.5"×5.75" (usually for photos). Typically, document carriers have some known physical characteristic or characteristics or some form of indicia that can be used as a basis to form boundaries within the scanned data. This allows unwanted document carrier information to be distinguished from wanted image data. For instance, the bottom of some document carriers contain a semi-circular notch, which is a known physical characteristic on all document carriers in that class. The semi-circular notch allows a user to more easily insert a document into the document carrier.

The automatic deskew and image cropping system 322 is preprogrammed with known physical characteristics of certain extraneous devices of certain classes. Namely, if a particular class of document carriers are known to have semi-circular notches, the automatic deskew and image cropping system 322 is preprogrammed to indicate that the particular class is associated with semi-circular notches as a known physical characteristic. If the known physical characteristic is found after scanning the document image 310, scanned data representing edges of the document carrier are located so that the entire unwanted extraneous information caused by the document carrier is cropped out and discarded.

Also, because the full size document carrier is too long to be fed sideways, only one orientation for scanning exists if the full size document carrier is used. As such, the known physical characteristic, such as the semi-circle, can only be at the bottom or top edges and cannot be at the left or right edges. Hence, the automatic deskew and image cropping system 322 searches for these known physical characteristics of document carriers, such as semi-circles, and crops out unwanted information appropriately. By discarding the edges of the document carrier, additional functions and operations of the automatic deskew and image cropping system 322 can be performed more accurately.

The automatic deskew and image cropping system 322 detects the skew angle of the document image (e.g., the document image 502 of FIG. 5) inside the scan image (e.g., the scan image 500 of FIG. 5) by first detecting an edge of the document image and then determining the slope of the edge. This allows the skew angle detection of the document image to be done without requiring the presence of text or special skew detection marks on the document image. This also allows the imaging program 326 to correct the skew of the document image without human intervention.

In addition, the automatic deskew and image cropping system 322 detects the boundary of the document image (e.g., the document image 502 of FIG. 5). There are several ways that the automatic deskew and image cropping system 322 detects the boundary of the document image. Two sample techniques are discussed in detail below for illustrative purposes only. Each technique can be custom configured for specific implementations. The first sample technique detects the boundary by locating a first and a last document image pixel for the first scan line of the document image, a first and a last document image pixel for the last scan line of the document image, a leftmost document image pixel of the document image, and a rightmost document image pixel of the document image within the scan image. The positioned information of these six pixels is then used to compute the extent (i.e., boundary) of the document image in the scan image after skew correction. This information is then provided to the imaging program 326, allowing the imaging program 326 to trim or crop the scan image to obtain the document image without much or all of the background information.

The automatic deskew and image cropping system 322 detects the skew angle and boundary information of a document image within a scan image by locating the first and last pixels of each scan line of the document image inside the scan image. The automatic deskew and image cropping system 322 can accomplish this by comparing each scan line of pixels in the scan image with a predetermined scan line of background pixels to locate the first and last document image pixels. This can alternatively, and preferably, be accomplished by comparing a neighborhood around each scan line of pixels in the scan image with predetermined background pixels to locate the first and last document image pixels. This allows boundary edge segments of the document image to be developed. The automatic deskew and image cropping system 322 then determines the length of each edge segment of the document image and calculates the skew of the edge segment. If the automatic deskew and image cropping system 322 determines that an edge segment is not long enough, the program 322 does not calculate the skew of that edge segment.

In addition, if the automatic deskew and image cropping system 322 determines that the document image has multiple skew angles (i.e., the skew of an edge segment in the document image is not equal to that of another edge segment of the document image), the program 322 determines that the document image has a non-rectangular shape. When this occurs, the automatic deskew and image cropping system 322 sets the skew angle of the document image to θ, which is preferably zero, whether the document image is skewed or not. In other words, if the automatic deskew and image cropping system 322 determines that the document image has a non-rectangular (e.g., circular, oval, or polygonal) shape, the program 322 preferably does not detect the skew angle of the document image. Instead, the program 322 provides the boundary information of the document image so that much or all of the background can be trimmed or cropped away from the scan image.

Moreover, when the automatic deskew and image cropping system 322 determines that the detected document image is not of a rectangular shape, the program 322 preferably defines the smallest rectangle that contains all of the six boundary pixels and informs the imaging program 326 to take the entire interior of this rectangle as the cropped document image (see, for example, FIG. 8). In this case, not all background information is trimmed off. The operation of automatic deskew and image cropping system 322 is now described in more detail below, also in conjunction with FIGS. 5–6 when the document 310 has a rectangular shape or FIGS. 7–8 when the document 310 has a non-rectangular shape.

Figure 6:
FIG. 6 shows the document image of FIG. 5 after being processed by the automatic deskew and image cropping system of FIGS. 3 and 4.

As can be seen from FIGS. 3 and 5–6, the skew detection and image cropping program 322 checks the scan image 500 to locate the first and last document image pixels of the first scan line of the document image 502. As can be seen from FIG. 5, the program 322 learns that the first scan line of the scan image 500 is the first scan line of the document image 502. The program 322 then locates the first document image pixel 518 and the last document image pixel 520 of the first scan line of the document image 502. As the automatic deskew and cropping system 322 continues checking the first and last document image pixels of other scan lines of the document image 502, edge segments 510, 512, 514, 516 are developed. In addition, the leftmost document image pixel 521 and rightmost document image pixel 522 are located. The first and last document image pixels (i.e., 524 and 526) of the last scan line of the document image 502 are also located. As can be seen from FIG. 5, the first document image pixel 524 of the last scan line of the document image 502 overlaps the last document image pixel 526 of that scan line.

After the edge segments 510, 512, 514, 516 of the document image 502 are developed, the automatic deskew and cropping system 322 calculates the skew angle α which is then sent to the imaging program 326 (FIG. 3), along with cropping boundaries computed from the skew angle a and the pixels 518, 520, 522, 524, 526.

Figure 9A:
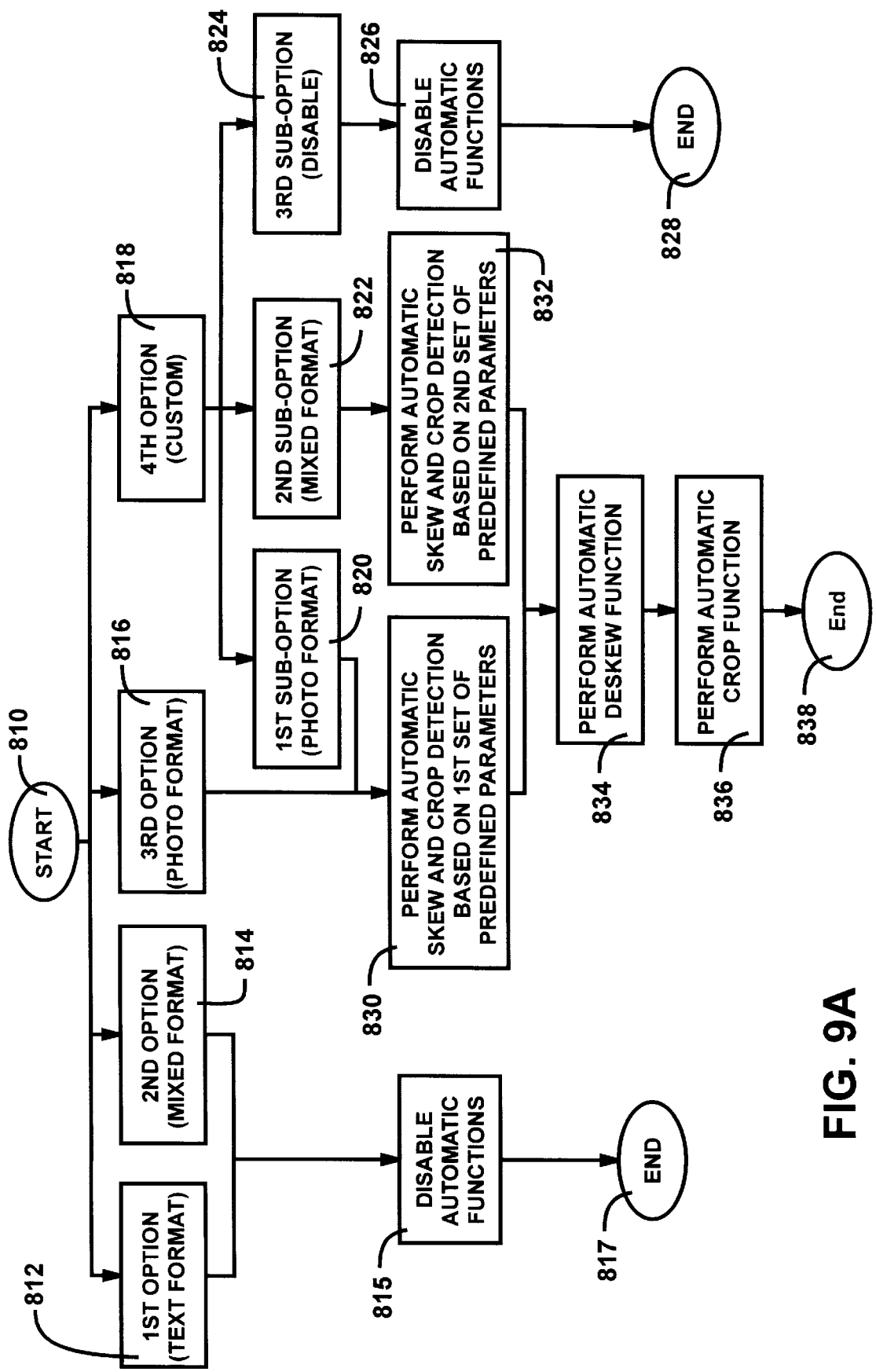
FIG. 9A illustrates a sample user interface for implementing the automatic deskew and image cropping system of FIGS. 3 and 4.

As described above, the automatic deskew and cropping system 322 of FIG. 3 also detects if the document image is of a rectangular shape when the program calculates the skew angle a of the document image. If the program 322 detects that the document image (e.g., the document image 702 of FIG. 7) is not of a rectangular shape, then the program 322 preferably does not calculate the skew angle of the document image and preferably sets the skew angle to zero. The automatic deskew and cropping system 322 detects whether a document image is rectangular or not by determining if the document image has multiple skew angles. When this occurs, the document image has a non-rectangular shape (e.g., the polygonal shape). In addition, the program 322 also detects if the document image has a rectangular shape by detecting if the edge segments of the document image are longer than a predetermined length. Those edge segments shorter than the predetermined length are discarded, and no skew angle is computed for such segments. If all detected segments are discarded, the program 322 determines that the document image has a non-rectangular shape (e.g., oval or circular shape) and again does not calculate the skew angle of the document image. When this occurs, the program 322 preferably locates those six boundary pixels of the document image. FIGS. 9A through 10 show in flow chart diagram form the automatic deskew and cropping system 322, which will be described in more detail below.

As can be seen from FIGS. 3 and 7–8, when the document 310 has a document image 702 that is of an oval shape, the program 322 of FIG. 3 detects multiple edges that are of different skew angles and/or shorter than the predetermined edge length. In one embodiment, the predetermined edge length contains approximately twenty five pixels. In alternative embodiments, the predetermined edge length can be longer or shorter than twenty five pixels.

When the program 322 detects that the document image 702 is not rectangular, the program 322 preferably locates the six boundary pixels (i.e., the first and last document image pixels 710 and 712 of the first scan line of the document image 702, the leftmost document image pixel 714, the rightmost document image pixel 716, and the first and last document image pixels 718 and 720 of the last scan line of the last scan line of the document image 702. As can be seen from FIG. 7, the first and last document image pixels 710 and 712 of the first scan line of the document image 702 overlap each other and the first and last document image pixels of the last scan line of the document image 702 overlap each other.

As can be seen in FIGS. 3 and 5–6, the imaging program 326 then corrects the skew of the document image 502 in accordance with the skew angle α received from the automatic deskew and cropping system 322 and eliminates all of the background 504 in the scan image 500 in accordance with the six document image pixels 518–526. The imaging program 326 does this in a known way, which will not be described in more detail below. The processed document image 600 is shown in FIG. 6.

As can be seen from FIGS. 5 and 6, the processed document image 600 of FIG. 6 is identical to the unprocessed document image 502 of FIG. 5 except that no background information of the scan image 500 is displayed in FIG. 6. In addition, the processed document image 600 is not skewed. Moreover, the processed document image 600 of FIG. 6 does not have the cut-off edge. This is due to the fact that the imaging program 326 further trims the document image 502 of FIG. 5 based on the document image pixels 518–526.

When processing the document image 702 of FIG. 7, the automatic deskew and cropping system 322 (FIG. 3) only sends the pixel information of the six boundary pixels 710 through 720 to imaging program 326 (FIG. 3). Based on these six pixels 710–720, the imaging program 326 creates a smallest rectangle 800 that contains all of these pixels and the document image 702. The imaging program 326 then trims away everything in the scan image 700 of FIG. 7 that is outside of the rectangle 800 to obtain the cropped document image 702.

As can be seen from FIG. 3, because the automatic deskew and cropping system 322 interfaces with the scan control program 324, the automatic deskew and cropping system 322 receives one scan line of pixels from the scan control program 324 as soon as the scan control program 324 controls the scanner 218 to finish scanning one such scan line. This causes the automatic deskew and cropping system 322 to operate in parallel with the operation of the scan control program 324. As a result, the automatic deskew and cropping system 322 can determine the skew angle and boundary information of the document image of the document 310 as soon as the scan control program 324 finishes scanning the document 310.

It is, however, appreciated that the automatic deskew and cropping system 322 is not limited to the above described configuration. FIG. 4 shows another embodiment of the image processing system 320 in which the automatic deskew and cropping system 322 only interfaces with the imaging program 326. This allows the automatic deskew and cropping system 322 to detect the skew angle and boundary information of the document image of the document 310 after the entire document 310 has be en scanned and its scan image has been sent to the imaging program 326 from the scan control program 324.

FIG. 9A illustrates a sample user interface for implementing the automatic deskew and image cropping system of FIGS. 3 and 4. The present invention increases user ease by automatically deskewing and cropping scanner background information and extraneous information (although automatic functions can be disabled, if desired). For automatic operation, the system starts 810 a user is given options for specifying a type of document to be scanned, such as text only, mixed format, photo only, custom options, etc., and the automatic deskew and cropping system 322 finds the best crop and deskew operation. The options can be presented in two tiers. The first tier allows novice users to simply specify the kind of document they are scanning (photo only, mixed document, etc.). The second tier allows more sophisticated users to further customize processing.

Namely, several options can be presented to a user. These options increase processing flexibility for the user. First, second and third options 812, 814, 816 can be for novice users and a fourth option 818 can be for advanced users with customization functions. The firs t option 812 can be for images th at contain text only and the second option 814 can be for mix ed formats (for example, images that contain a combination of photographs, text, graphics, etc). For the first and second options 812, 814, automatic deskew and cropping functions are preferably disabled 815 and the routine ends 817. The third option 816 can be for images that contain only photos. If the user chooses the fourth option 818, the user can be presented with three customization sub-options. A first sub-option 820 for images that contain only photos, a second sub-option 822 for mixed formats and a third sub-option 824 for manually disabling the automatic functions 826 after which, the routine ends 828.

If the third option 824 and the first sub-option 820 are chosen, an automatic skew and crop detection step 830 is performed based on a first set of predefined parameters (discussed below in detail). If the second sub-option 822 is chosen, an automatic skew and crop detection step 832 is performed based on a second set of predefined parameters (discussed below in detail). The automatic deskew and cropping system 322 determines the boundaries and location of the scanner background and extraneous information, if it exists. As discussed above, the extraneous information can be caused by a document carrier. The document carrier information is found based on the first and second set of predefined parameters (discussed below in detail). Next, the automatic deskew and cropping system 322 performs an automatic deskew and cropping (crop out portions of the scanned data that are not part of the photo) function as steps 834 and 836, the routing then ends 838. For example, during cropping, unwanted scanner background or document carrier information will be automatically cropped out. In addition, the automatic functions provide cropping for multiple photos being scanned as a single page. In this case, regions outside of the multiple photos are cropped out.

The following description is for illustrative purposes only. The extraneous device can be any extraneous device and does not have to be a document carrier. Specifically, if a document carrier is the extraneous device causing the extraneous information, depending on the option chosen by the user, the automatic deskew and cropping system 322 searches for the known physical characteristics of the particular document carrier. For instance, if the user chooses the third option or the first sub-option, for example, for photos only, the automatic deskew and cropping system 322 searches for either a half or full size document carrier. This is because a user could utilize either the half or full size document carrier for a photo. Similarly, if the user chooses the second sub-option, for example for mixed formats, the automatic deskew and cropping system 322 preferably searches for a full size document carrier. This is because a mixed document typically is too large for the half size document carrier. Therefore, a search is preferably performed for either the half or full size document carrier if the third option or the first sub-option (photo only) is chosen while a search is preferably performed for the full size document carrier if the second sub-option (mixed format) is chosen.

For the half size document carrier, an initial search is performed for known physical characteristics, such as a semi-circle at the bottom, top, right, or left edges. This is because some document carriers, such as the half size document carrier, can be fed into the scanner device in any orientation. As a result, the known physical characteristic, such as the semi-circle, can appear at the bottom, top, left or right edges of the scan. For the full size document carrier, an initial search is performed for known physical characteristics, such as a semi-circle at the bottom or top edges. This is because some document carriers, such as the full size document carrier, can be fed into the scanner device in only two orientations. As such, the known physical characteristic, such as the semi-circle, can appear only at the bottom or top edges of the scan.

If the known physical characteristic is found, scanned data representing edges of the document carrier are ignored during computation of skew and crop statistics, and are eventually cropped out and discarded as unwanted information of the scan. Also, because the full size document carrier is too long to be fed sideways, only one orientation for scanning exists if the full size document carrier is used. As such, the known physical characteristic, such as the semi-circle, can only be at the bottom or top edges and cannot be at the left or right edges. Hence, the present invention searches for these known physical characteristics of document carriers, such as semi-circles, and crops out unwanted information appropriately. By ignoring the edges of the document carrier, more accurate automatic deskewing and cropping of the information of interest can be performed.

Figure 9B:
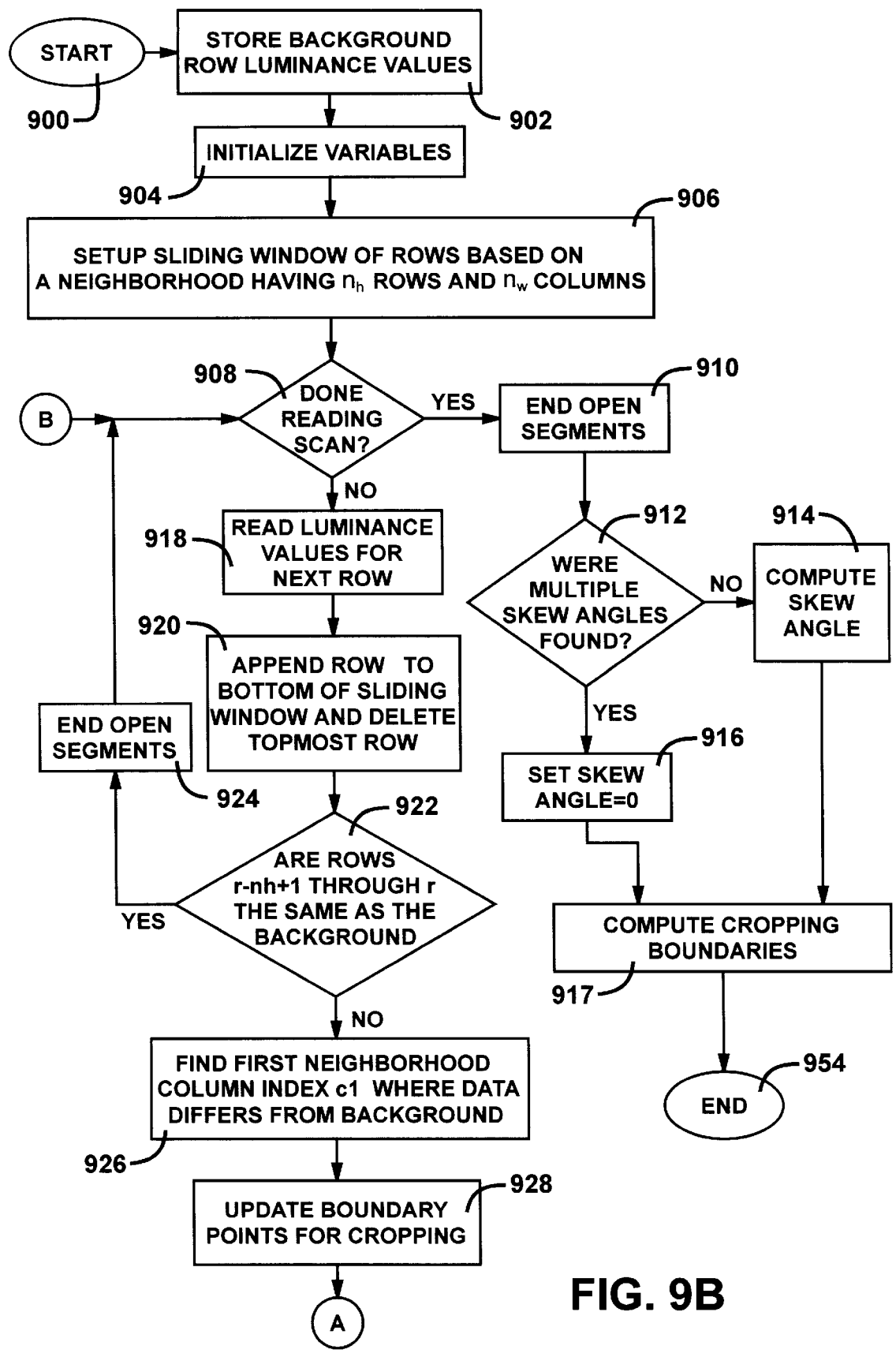
FIGS. 9B–9C and 10 show flow chart diagrams of the automatic deskew and image cropping system of FIGS. 3 and 4.
Figure 9C:
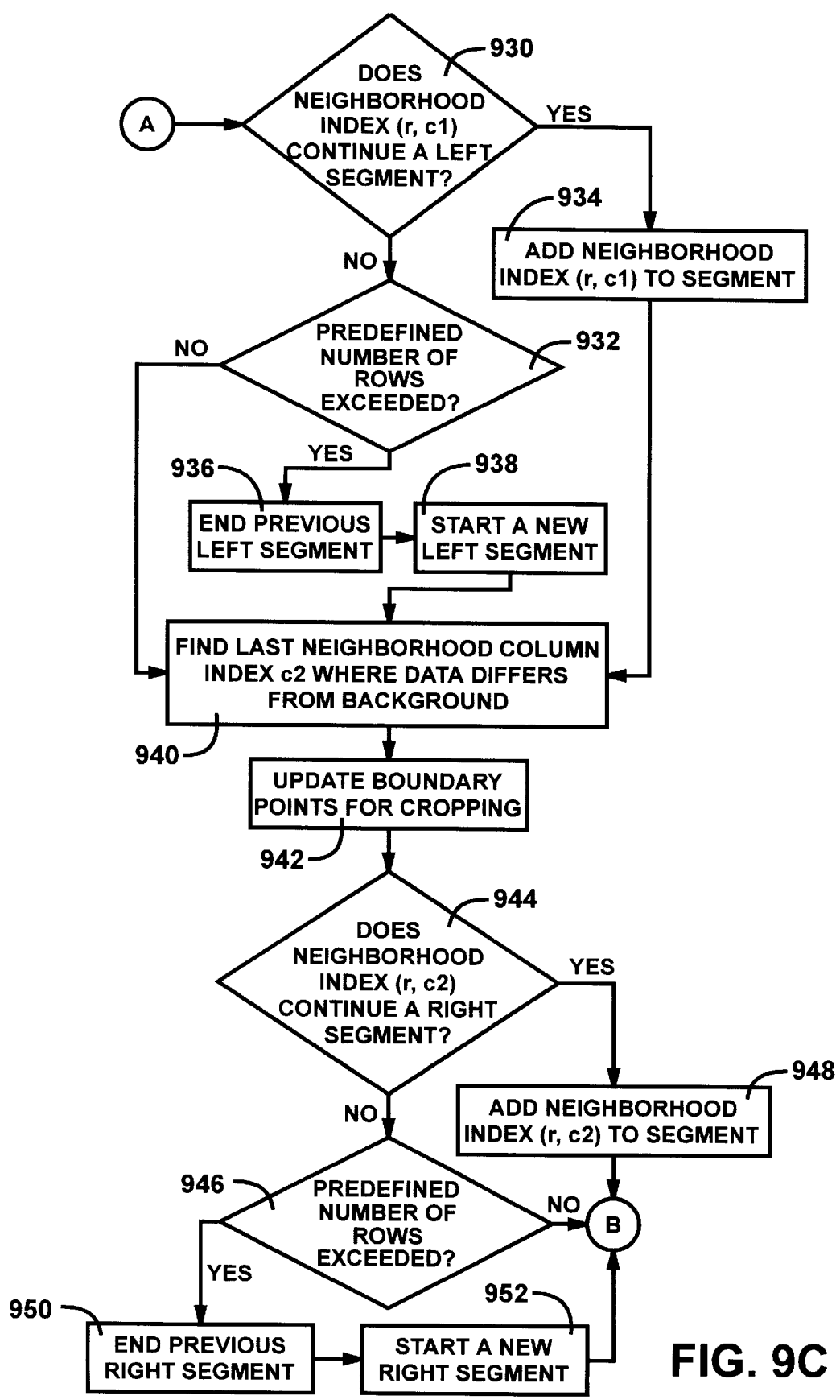
Figure 10:
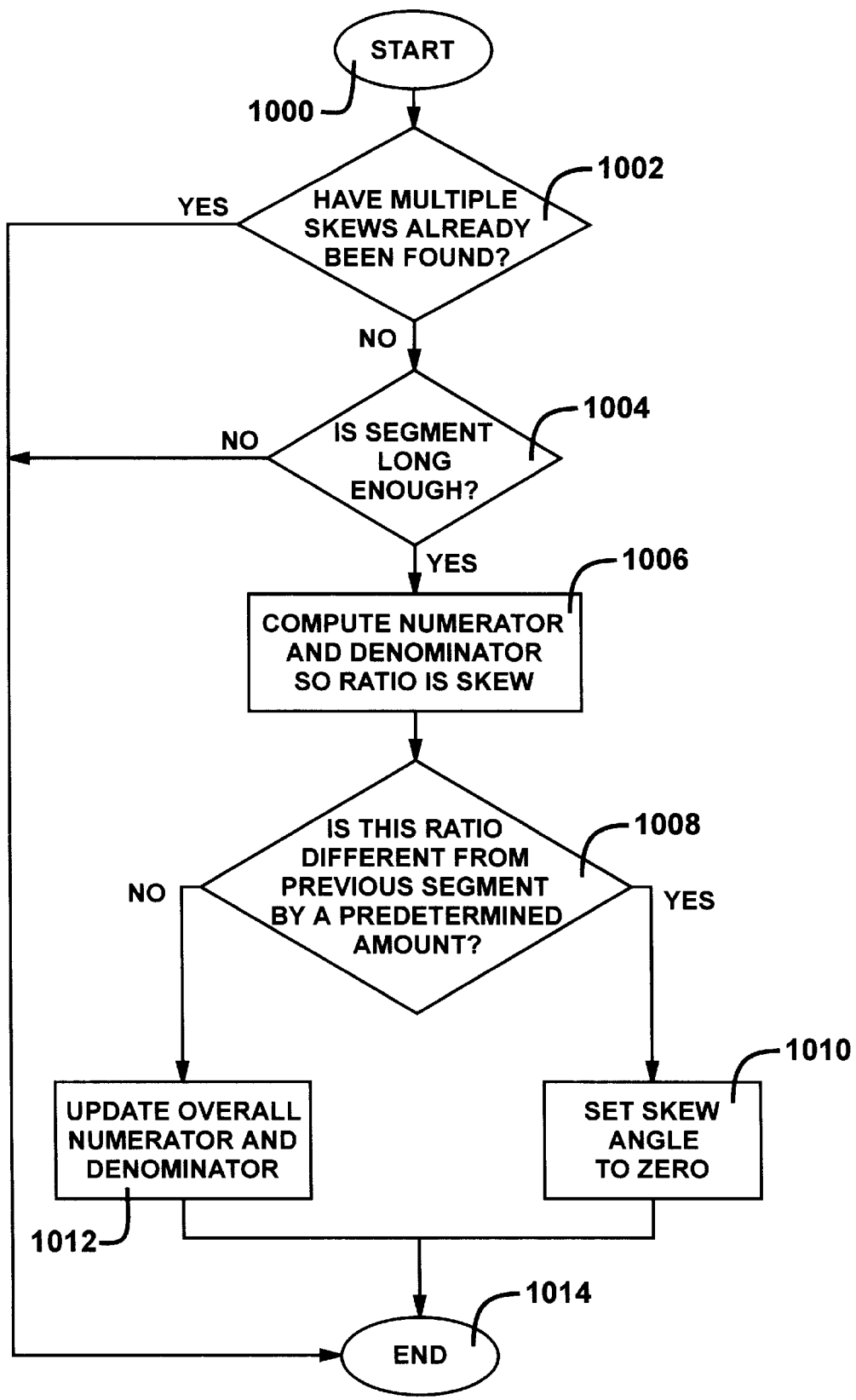
Figure 11:
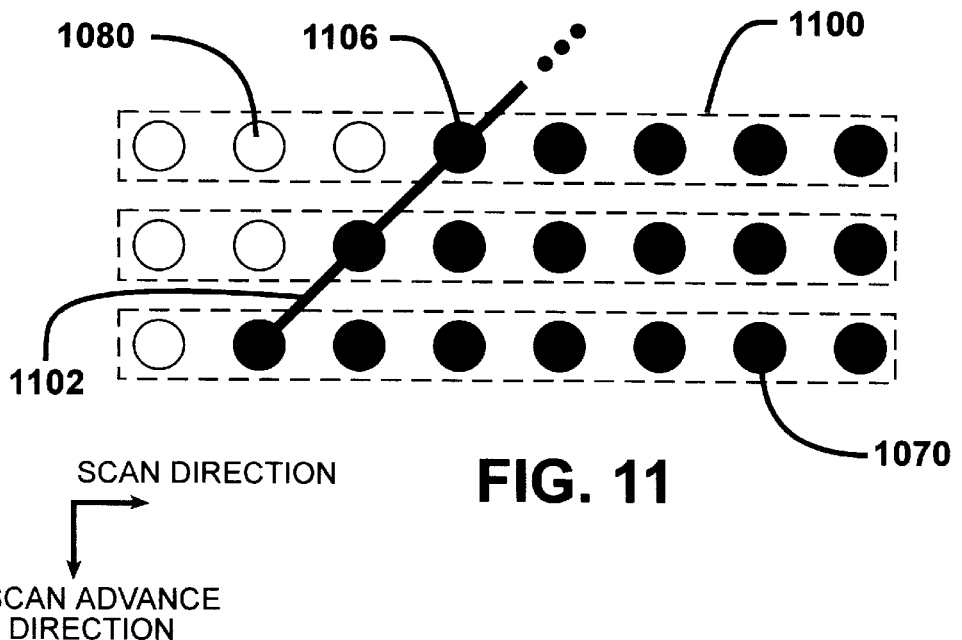
FIGS. 11 and 12 illustrate calculation of the skew angle and boundary information of a document image by the automatic deskew and image cropping system of FIGS. 3 and 4 when the document image has rectangular and non-rectangular shapes.

FIGS. 9B and 9C show the process of the automatic deskew and cropping system 322 (FIGS. 3 and 4) in developing the edge segments and the six boundary pixels of the document image. FIG. 10 shows the process of the system 322 of FIGS. 3 and 4 in detecting the skew angle of the document image based on the edge segments developed by the process of FIGS. 9B and 9C. FIG. 11 shows how edge segments are developed in a rectangular document image.

Figure 12:
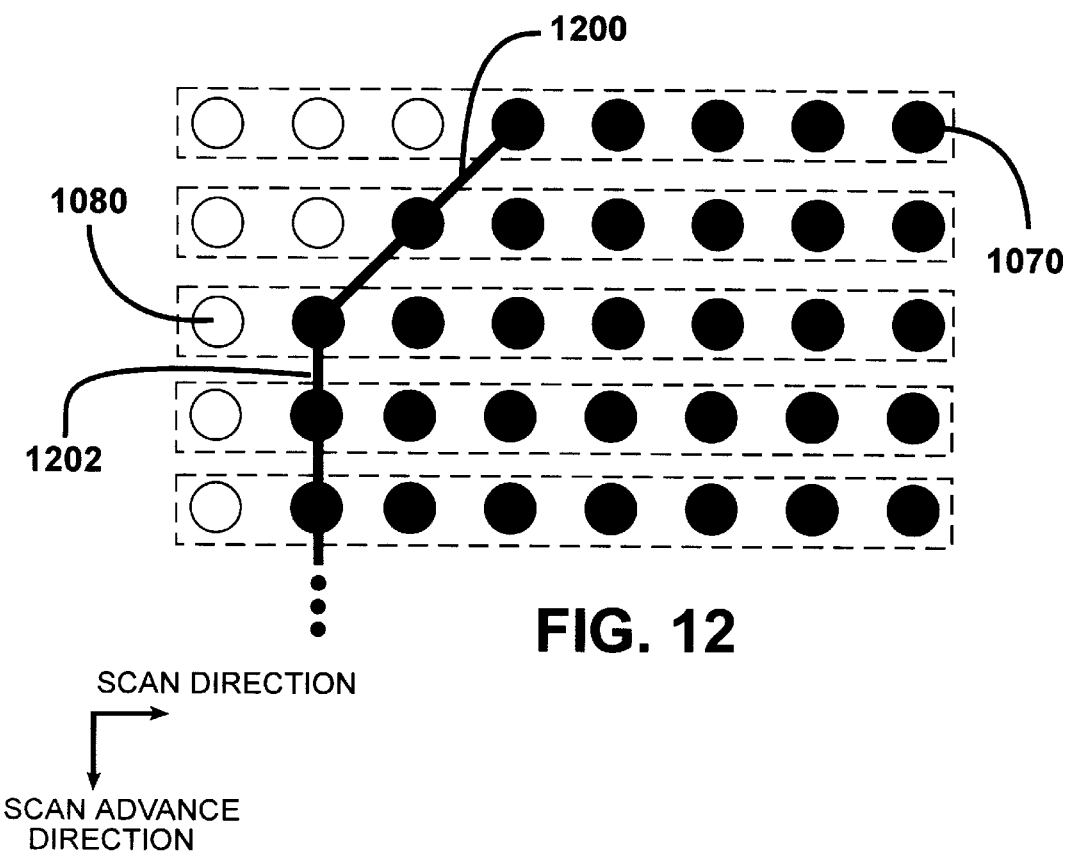

FIG. 12 shows how edge segments are developed in a circular or oval document image. FIGS. 9B, 9C and 10 will be described in more detail below, also in connection with FIGS. 11 and 12.

In one embodiment, an edge of the document image is determined within a scan image and that edge is used to determine the skew angle of the document image. The edge can be determined by locating the first or last document image pixel of each scan line of pixels in the scan image that belongs to the document image (i.e., the edge pixel of the document image along that scan line). This is accomplished by comparing each scan line of pixels with a pre determined scan line of background pixels. The skew angle of the document image is then determined by computing the slope of the detected edge in the scan image.

In another embodiment, a pixel of a scan line is regarded as an image pixel when its color is different from the color of the corresponding reference background pixel by more than the predetermined threshold value and the color of its adjacent pixel is also different from the color of the corresponding reference background pixel by more than the predetermined threshold value. In other words, small groups of pixels are analyzed together, such as a neighborhood of pixels. This can be accomplished by using a sliding window of pixels. This increases accuracy and more readily distinguishes actual wanted document data from unwanted extraneous information and background noise. This embodiment is more robust in the presence of scanner noise.

Specifically, as can be seen from FIGS. 9B and 9C, the process starts at step 900. At step 902 color values of background pixels are set. At step 904 variables are initialized and a neighborhood size is defined. The neighborhood size can be defined with a pixel size having a neighborhood height of pixels and a neighborhood width of pixels ($n_h$ rows, $n_w$ columns). The values are set as the reference values for comparing with the colors of the pixels of a neighborhood around each scan line of the scan image to locate the first and last image pixels (i.e., edge pixels) of each scan line. In another embodiment, only the luminance valve of each pixel is used, where luminance is computed as approximately one-fourth red, one-half green, and one-eighth blue. In one embodiment, a pixel is regarded as an image pixel when its color (or luminance) is different from the color (or luminance) of the corresponding reference background pixel by more than a predetermined threshold value. The term color will be used hereinafter interchangeably to mean color and/or luminance. The threshold value is typically a constant that is determined based on the expected variability of the scanner background.

At step 906, a sliding window can be set up as a neighborhood of pixels comprised of several rows, such as two, three, four, etc. rows. The size of the sliding window or neighborhood of pixels can be adjusted to suit certain conditions. For example, a larger neighborhood of pixels can be used when a photograph is to be scanned. In contrast, a smaller neighborhood of pixels can be used when a mixed document is to be scanned. It should be noted that the neighborhood of pixels for a mixed document should not exceed a maximum predetermined value. This is because text data could be mistaken as background noise if a neighborhood of pixels that is too large is used. The neighborhood of pixels can be defined with a size having a neighborhood height and a neighborhood width ($n_h$ rows, $n_w$ columns).

At step 908, it is determined if all of the scan lines of the scan image have been processed. If so, steps 910–914 are performed to calculate the skew angle of the document image inside the scan image. As can be seen from FIG. 9B, step 912 is employed to determine if the document image is of non-rectangular shape. The program 322 (FIGS. 3 and 4) does this at step 912 by determining if different skew angles are found for the edge segments of the document image. If so, the program 322 does not calculate the skew angle of the document image. Instead, the skew angle is set to zero in step 916. If, at step 912, it is determined that these are not multiple skew angles, then step 914 is performed to calculate the skew angle of the document image. In either case, the program 322 finishes by computing the cropping boundaries in step 917 and ending at step 954.

When, at step 908, if it is determined that the scan image has not been completely checked, step 918 is then performed to obtain the neighborhood around the next unchecked scan line of pixels (e.g., scan row r). Next, although the sliding window is initially set at some number, at step 920 the sliding window is incremented every time a scan line is checked so that row r is appended to the bottom of the sliding window and the topmost row is deleted. A color of a neighborhood around each of the pixels of the scan row r is then compared with a color of predetermined background pixels at step 922 to determine if they match. In other words, for a neighborhood of three rows, rows r, r–1, r–2 are compared to predetermined background pixels. If they match, (i.e., rows $r-n_h+1$ through r contains substantially background pixel values), then the program 322 returns to step 908 via step 924. If not, step 926 is performed, at which the first document image pixel (i.e., pixel c1) where a neighborhood index, such as row r and column c1 having a color different from that of the corresponding background pixel is located. In this case, row r and column c1 indicates a lower corner. However, this row is arbitrary and any row could be used for the neighborhood index, as long as it is the same all of time.

The process then moves to step 928, at which the boundary pixel storage is updated. This is done by comparing the current first and last pixels with the stored six boundary pixels to determine if these six pixels need to be updated. The positioned values of these six pixels are initially set at zero. If, for example, the positional value of the current first pixel is less than that of the stored leftmost pixel, then the stored leftmost pixel is replaced with the current first pixel. This allows the six boundary pixels of the document image to be finally determined.

Then step 930 is performed, at which it is determined if neighborhood index (r, c1) continue a left edge segment. If so, step 934 is performed to continue the edge segment by adding neighborhood index (r, c1) to segment the edge segment. For example, as can be seen from FIG. 11, with image pixels 1070 and background pixels 1080, if scan line 1100 is currently checked and pixel 1106 is determined to be the first pixel of the scan line 1100. Step 930 of FIG. 9C then determines if the pixel 1106 continues the edge segment 1102 and causes the edge segment 1102 to extend from the pixel 1106. However, edge segments are preferably allowed to skip a predefined number of rows if subsequent rows are not aligned. This is because random noise can cause one or several rows to temporarily misalign or diverge for only a few rows. In this case, the edge segment should continue. FIG. 12 shows the development of edge segments 1200 and 1202 of a circular or oval document image. Similarly, edge segments are preferably allowed to skip a predefined number of rows if subsequent rows are not aligned.

Thus, as can be seen from FIG. 9C, when the answer is no at step 930, it is determined in step 932 whether a predefined number of rows has been exceeded. If so, step 936 is then performed to end that left edge segment. Step 938 is then performed to start a new left edge segment from this first pixel. If a predefined number of rows has not been exceeded, then steps 940 through 952 are performed so that a last neighborhood column index c2 is located where a color differs from that of the corresponding background pixel. As can be seen from FIGS. 9B–9C, steps 940–952 are basically the same steps as steps 926–938, except that steps 940–952 are employed to locate and process the last pixel of the scan line while steps 926–938 are employed to locate and process the first pixel of the scan line. Also, steps 926–938 can be performed in parallel with steps 940–952. In other words, steps 940–952 do not have to be performed sequentially after steps 926–938.

FIG. 10 shows the process of updating the skew information based on a detected edge segment. This process is undertaken when a segment is ended, as in steps 910, 924, 936, and 950 of FIGS. 9B and 9C. The routine starts 1000 and it is determined in step 1002 whether multiple skews have already been found. If so, the routine ends at step 1014. If not, whenever the segment is too short, it is discarded in step 1004. If the segment is long enough, a numerator and denominator ratio are determined at step 1006. Next, if the ratio is too different from that of a previous segment, or in other words, if the document image is determined to have a non-rectangular shape in step 1008, the skew angle is set to zero, and subsequent segments are discarded in step 1010. Otherwise, the slope of the detected segment is used to update the skew angle estimate in step 1012 and the routine then ends in step 1014.

In addition, in typical scanner devices, the user is permitted to change brightness settings, which alters the luminance values of the scanned data. Since the automatic deskew and cropping system 322 can use luminance values to perform edge detection, the automatic deskew and cropping system 322 performs dynamic adjustment of background threshold values to match changes in brightness settings. Moreover, the user is usually permitted to change color/grayscale mode settings (such as 24 bit color or 8 bit grayscale scans), which alters the luminance values of the scanned data since the luminance values of grayscale images are different from the color images. The automatic deskew and cropping system 322 performs dynamic adjustment of threshold values to match changes in color/grayscale mode settings.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A method using a digital processor for automatically determining a skew angle of a document image inside a scan image having a plurality of scan lines of pixels, comprising:
   (A) successively receiving the scan lines of pixels of the scan image by the digital processor;
   (B) automatically locating predefined background pixels in the scan image by the processor and comparing a neighborhood of pixels located around a group of scan lines with the background pixels to define left and right image boundaries for each group of scan lines;
   (C) digitally forming at least one edge segment by extending at least one image boundary between successive groups of scan lines during receipt of the scan lines; and
   (D) calculating a slope of all of the digitally formed edge segments that are longer than a predetermined length value to automatically determine the skew angle without manual guidance.

2. The method of claim 1 further comprising, after step (A) and before step (B), searching for known characteristics within the document image and ignoring the known characteristics if found.

3. The method of claim 1, wherein the scan image includes document image pixels of the document image and background pixels of the scan image, wherein the step (B) further comprises:
   (I) receiving a neighborhood of pixels located around a group of scan lines; and
   (II) comparing the group of scan lines of the scan image with corresponding background pixels to define left and right image boundaries for each group of scan lines.

4. The method of claim 3, wherein step (II) further comprises:
   (i) comparing color of the group of scan lines with color of the corresponding background pixels;
   (ii) comparing color of adjacent pixels of the group of scan lines with color of the corresponding background pixels; and
   (iii) confirming the location of an image boundary when the color of the group of scan lines is different from that of the corresponding background pixels and the color of the adjacent pixels are different from that of the corresponding background pixels.

5. The method of claim 4, wherein the color of each of the background pixels is approximately one-fourth red, one-half green, and one-eighth blue.

6. The method of claim 1, wherein step (C) further comprises:
   (I) ending the edge segment and generating a new edge segment that extends from an end scan line of the group of scan lines if the group of scan lines do not continue the edge segment; and
   (II) repeating steps (A), (B) and (C) until all scan lines have been received.

7. The method of claim 1, wherein step (C) further comprises:
   (I) ending the edge segment and generating a new edge segment that extends from an end scan line of the group of scan lines if the group of scan lines do not continue the edge segment; and
   (II) repeating steps (A), (B) and (C) a predetermined number of times.

8. The method of claim 1, wherein step (C) further comprises:
   (I) ending the edge segment and generating a new edge segment that extends from an end scan line of the group of scan lines if the group of scan lines do not continue the edge segment; and
   (II) dynamically repeating steps (A), (B) and (C) until an appropriate number of edge segments has been located.

9. The method of claim 8, wherein the step (D) further comprises:
   (a) determining if the document image has a rectangular shape by determining (1) if the edge segment is at least one of approximately perpendicular to previous edge segments and approximately parallel to previous edge segments and (2) if the edge segment is longer than the predetermined length value; and
   (b) setting the skew angle to a predetermined value if the document image does not have the rectangular shape.

10. The method of claim 9, wherein the skew angle is set to zero if the document image does not have the rectangular shape.

11. The method of claim 9, wherein the predetermined length value is approximately equal to twenty five pixels.

12. An apparatus, comprising:

(A) a storage medium;

(B) a computer executable program stored on the storage medium, the computer executable program, when executed, automatically determines a skew angle of a document image inside a scan image having a plurality of scan lines of pixels, wherein the computer executable program comprises, (I) a first set of instructions that receives the scan lines of pixels of the scan image;

(II) a second set of instructions that automatically locates predefined background pixels in the scan image and compares a neighborhood of pixels located around a group of scan lines with the background pixels to define left and right image boundaries for each group of scan lines;

(III) a third set of instructions that forms one or more edge segments by extending one or more image boundaries between continuous groups of scan lines during receipt of the scan lines; and (IV) a fourth set of instructions that calculates a slope of all of the formed edge segments that are longer than a predetermined length value to automatically determine the skew angle without manual guidance.

13. The apparatus of claim 12, wherein the scan image includes image pixels of the document image and background pixels of the scan image, wherein the second set of instructions further comprises, (a) a first subset of the second set of instructions that receives a neighborhood of pixels located around a group of scan lines;

(b) a second subset of the second set of instructions that compares color of the group of scan lines with color of the corresponding background pixels;

(c) a third subset of the second set of instructions that compares color of adjacent pixels of the group of scan lines with color of the corresponding background pixels; and (d) a fourth subset of the second set of instructions that confirms the location of an image boundary when the color of the group of scan lines is different from that of the corresponding background pixels and the color of the adjacent pixels are different from that of the corresponding background pixels.

14. The apparatus of claim 13, wherein the color of each of the background pixels is approximately one-half green, one-fourth red, and one-eighth blue.

15. The apparatus of claim 12, further comprising a first subset of the third set of instructions that ends the edge segment and generates a new edge segment that extends from an end scan line of the group of scan lines if the group of scan lines do not continue the edge segment.

16. The apparatus of claim 14, further comprising (a) a first subset of the fourth set of instructions that determines if the document image has a rectangular shape by determining (1) if the edge segment is at least one of approximately perpendicular and approximately parallel to previous edge segments and (2) it the edge segment is longer than a predetermined length value; and (b) a second subset of the fourth set of instructions that sets the skew angle to zero if the document image is not substantially in the rectangular shape.

17. The apparatus of claim 12, further comprising a fifth set of instructions that searches for known characteristics within the document image and ignores the known characteristics if found.

18. An apparatus, comprising:

(A) a storage medium;

(B) a computer executable program stored on the storage medium, the computer executable program, when executed, automatically determines a boundary of a document image inside a scan image of a plurality of received scan lines of pixels, wherein the computer executable program comprises, (I) a first set of instructions that automatically compares a neighborhood of pixels located around a group of scan lines of pixels of the scan image against predetermined background pixels to locate, (1) a first document image pixel and a last document image pixel for a first scan line of the scan lines, (2) a first document image pixel and a last document image pixel for a last scan line of the scan lines, (3) a leftmost document image pixel of the document image, and (4) a rightmost document image pixel of the document image;

(II) a second set of instructions that connects the first and last document image pixels of the first and last scan lines, the leftmost document image pixel, and the rightmost document image pixel together during receipt of the scan lines to automatically define the boundary of the document image without manual guidance.

19. The apparatus of claim 15, further comprising a fourth set of instructions that determines if the document image has multiple skew angles and a fifth set of instructions that extends (1) a first horizontal line through the first and last document image pixels of the first scan line, (2) a second horizontal line through the first and last document image pixels of the last scan line, (3) a first vertical line through the leftmost document image pixel, and (4) a second vertical line through the rightmost document image pixel to define the boundary of the document image if the document image has multiple skew angles.

20. The method of claim 2, further comprising performing steps (B), (C), (D) based on a set of predefined parameters in direct response to user input regarding the document image.

* * * * *

UNITED STATES PATENT AND TRADEMARK OFFICE
CERTIFICATE OF CORRECTION

PATENT NO.    : 6,310,984 B2
DATED         : October 30, 2001
INVENTOR(S)   : Sansom-Wai et al.

It is certified that error appears in the above-identified patent and that said Letters Patent is hereby corrected as shown below:

<u>Column 18,</u>
Line 6, after (2), delete "it" and insert in lieu thereof -- if --.

Signed and Sealed this

Fourth Day of June, 2002

Attest:

Attesting Officer

JAMES E. ROGAN
*Director of the United States Patent and Trademark Office*